United States Patent
Ozaki (10) Patent No.: US 9,574,322 B2
(45) Date of Patent: Feb. 21, 2017

(54) HYDRAULIC EXCAVATOR

(71) Applicant: KOMATSU LTD., Tokyo (JP)

(72) Inventor: Tomoaki Ozaki, Komatsu (JP)

(73) Assignee: KOMATSU LTD., Tokyo (JP)

( * ) Notice: Subject to any disclaimer, the term of this patent is extended or adjusted under 35 U.S.C. 154(b) by 296 days.

(21) Appl. No.: 14/399,000

(22) PCT Filed: Aug. 8, 2014

(86) PCT No.: PCT/JP2014/071027
§ 371 (c)(1),
(2) Date: Nov. 5, 2014

(87) PCT Pub. No.: WO2015/059982
PCT Pub. Date: Apr. 30, 2015

(65) Prior Publication Data
US 2016/0281326 A1 Sep. 29, 2016

(51) Int. Cl.
*E02F 9/08* (2006.01)
*F01N 3/20* (2006.01)
*E02F 3/32* (2006.01)

(52) U.S. Cl.
CPC .......... *E02F 9/0866* (2013.01); *E02F 9/0808* (2013.01); *E02F 9/0875* (2013.01); *E02F 9/0883* (2013.01); *F01N 3/2066* (2013.01); *B60Y 2200/412* (2013.01); *E02F 3/32* (2013.01); *E02F 9/0891* (2013.01); *F01N 2590/08* (2013.01); *F01N 2610/02* (2013.01); *F01N 2610/10* (2013.01); *Y02T 10/24* (2013.01)

(58) Field of Classification Search
None
See application file for complete search history.

(56) References Cited

U.S. PATENT DOCUMENTS

| 8,973,692 B1* | 3/2015 | Okuda | B60L 11/1877 180/68.5 |
| 2005/0201852 A1* | 9/2005 | Iida | E02F 9/0883 414/385 |
| 2006/0230650 A1 | 10/2006 | Murakami et al. | |
| 2010/0266458 A1* | 10/2010 | Takeshita | E02F 9/0866 422/109 |

(Continued)

FOREIGN PATENT DOCUMENTS

| CN | 102444148 A | 5/2012 |
| CN | 202965936 U | 6/2013 |

(Continued)

*Primary Examiner* — John Walters
*Assistant Examiner* — Hilary L Johns
(74) *Attorney, Agent, or Firm* — Drinker Biddle & Reath LLP (57) ABSTRACT

A hydraulic excavator enabling an efficient arrangement of a coolant pipe is provided. A fuel tank has a lateral side surface located outward relative to a lateral edge of a revolving frame. The hydraulic excavator includes an exterior cover laterally covering a mount member, a coolant pipe directing a coolant for an engine to a reducing agent tank, and a reinforcement plate. The coolant pipe is arranged through a space under the fuel tank and between the mount member and the exterior cover. The reinforcement plate is provided outward of the coolant pipe and inward of the exterior cover.

8 Claims, 9 Drawing Sheets

(56) References Cited

U.S. PATENT DOCUMENTS

| | | | | |
|---|---|---|---|---|
| 2011/0005853 A1* | 1/2011 | Kamiya | ................ | B60K 13/04 180/296 |
| 2012/0067660 A1 | 3/2012 | Kashu et al. | | |
| 2012/0174566 A1* | 7/2012 | Yamashita | ............ | B60K 13/04 60/295 |
| 2013/0071295 A1* | 3/2013 | Terakawa | ............ | E02F 9/0858 422/168 |
| 2014/0023473 A1* | 1/2014 | Kobayashi | ........... | E02F 9/0875 414/687 |
| 2014/0196975 A1* | 7/2014 | Hata | .................... | E02F 9/0866 180/309 |
| 2014/0318882 A1* | 10/2014 | Sawada | ................ | B60K 13/04 180/309 |
| 2015/0016932 A1* | 1/2015 | Azuma | ............... | E02F 9/0833 414/687 |
| 2015/0086314 A1* | 3/2015 | Okuda | ..................... | E02F 3/30 414/685 |
| 2015/0184361 A1* | 7/2015 | Imano | .................. | E02F 9/0866 180/309 |

FOREIGN PATENT DOCUMENTS

| | | |
|---|---|---|
| JP | S56-13018 U | 2/1981 |
| JP | H04-130348 U | 11/1992 |
| JP | H11-200407 A | 7/1999 |
| JP | 2003-278178 A | 10/2003 |
| JP | 2006-274675 A | 10/2006 |
| JP | 2008-240676 A | 10/2008 |
| JP | 2013-002082 A | 1/2013 |
| JP | 2013-241808 A | 12/2013 |
| JP | 2014-080907 A | 5/2014 |
| JP | 5546707 B1 | 7/2014 |
| WO | WO-2014/061168 A1 | 4/2014 |
| WO | WO 2014/081665 A1 | 5/2014 |

* cited by examiner

HYDRAULIC EXCAVATOR

TECHNICAL FIELD

The present invention relates to a hydraulic excavator.

BACKGROUND ART

An exhaust gas treatment device is mounted on a hydraulic excavator. As the exhaust gas treatment device, for example, a diesel particulate filter device (DPF), a diesel oxidation catalyst device (DOC), a selective catalytic reduction device (SCR), and the like are available. In particular, the selective catalytic reduction device reduces a nitrogen oxide in an exhaust gas to thereby purify the exhaust gas. A reducing agent used for this exhaust gas treatment is stored in a reducing agent tank.

Japanese Patent Laying-Open No. 2013-2082 (PTD 1) discloses a structure in which an exhaust gas treatment device is arranged rearward in a vehicular body and a reducing agent tank is arranged forward in the vehicular body.

CITATION LIST

Patent Document

PTD 1: Japanese Patent Laying-Open No. 2013-2082

SUMMARY OF INVENTION

Technical Problem

A hydraulic excavator including a reducing agent tank heats a reducing agent in the reducing agent tank by arranging, in the reducing agent tank, a coolant pipe in which an engine coolant flows, in order to prevent the reducing agent in the reducing agent tank from freezing. The area of a revolving frame of the hydraulic excavator is limited. Therefore, in the case where the reducing agent tank is arranged forward in the vehicular body like PTD 1, it is a challenge where the coolant pipe is to be arranged.

An object of the present invention is to provide a hydraulic excavator enabling an efficient arrangement of the coolant pipe.

Solution to Problem

A hydraulic excavator of the present invention includes an engine, an exhaust gas treatment device, a reducing agent tank, a revolving frame, a mount member, a fuel tank, an exterior cover, a coolant pipe, and a reinforcement plate. The exhaust gas treatment device treats an exhaust gas from the engine through a reduction reaction. The reducing agent tank is arranged forward of the exhaust gas treatment device. The reducing agent tank stores a reducing agent to be supplied to the exhaust gas treatment device. On the revolving frame, the engine, the exhaust gas treatment device, and the reducing agent tank are mounted. The mount member is provided on the revolving frame and located forward of the exhaust gas treatment device and rearward of the reducing agent tank. The fuel tank is mounted on the mount member. The fuel tank has a lateral side surface located outward relative to a lateral edge of the revolving frame. The exterior cover laterally covers the mount member. The coolant pipe directs a coolant for the engine to the reducing agent tank. The coolant pipe is arranged through a space under the fuel tank and between the mount member and the exterior cover. The reinforcement plate is provided outward of the coolant pipe and inward of the exterior cover.

A reducing agent and a precursor of the reducing agent are herein collectively referred to as "reducing agent."

In the hydraulic excavator of the present invention, the coolant pipe can be prevented from being caught between the exterior cover and the mount member, and the coolant pipe can therefore be arranged in the space under the fuel tank and between the mount member and the exterior cover. Accordingly, the coolant pipe can efficiently be arranged.

Regarding the hydraulic excavator, the reinforcement plate is provided at a position overlapping the mount member as seen laterally. In this way, the reinforcement plate can be made small while the strength necessary for protection of the coolant pipe is ensured.

Regarding the hydraulic excavator, the reinforcement plate has a bent portion formed between an upper end and a lower end of the coolant pipe overlapping the reinforcement plate as seen laterally. In this way, the coolant pipe can more reliably be protected by the bent portion having a high strength.

The hydraulic excavator further includes a clamp member supporting the coolant pipe with respect to the revolving frame. The clamp member is arranged near the mount member to position the coolant pipe. Accordingly, the coolant pipe and the mount member can be prevented from interfering with each other.

Advantageous Effects of Invention

As seen from the foregoing, the present invention can prevent the coolant pipe from being caught between the exterior cover and the mount member. Thus, the coolant pipe can be arranged in a space under the fuel tank and between the mount member and the exterior cover, and the coolant pipe can efficiently be arranged.

DESCRIPTION OF EMBODIMENTS

An embodiment of the present invention will be described hereinafter with reference to the drawings.

Initially, a structure of a hydraulic excavator to which the concept according to the present invention is applicable will be described.

Figure 1:
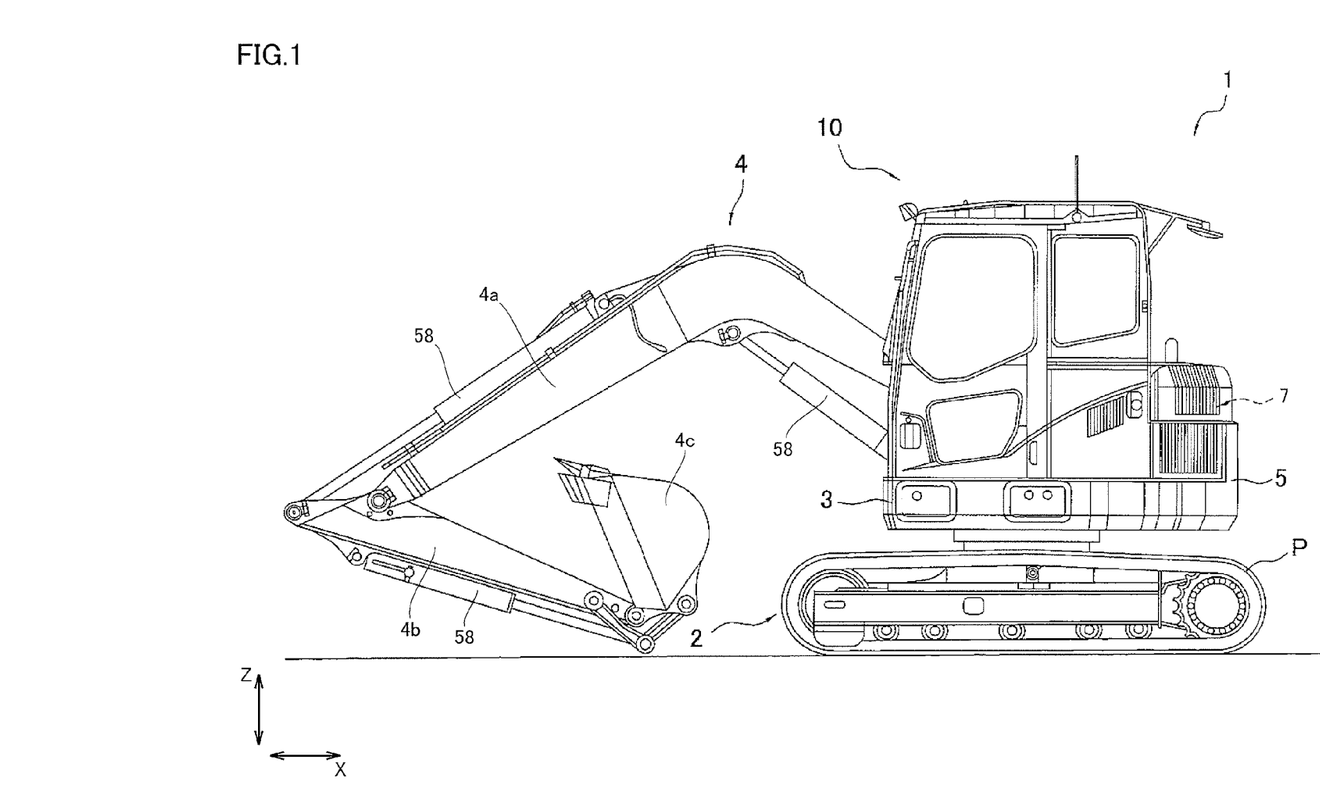
FIG. 1 is a side view showing a structure of a hydraulic excavator according to one embodiment of the present invention.

FIG. 1 is a side view showing a structure of a hydraulic excavator according to one embodiment of the present invention. Hydraulic excavator 1 according to the present embodiment mainly includes a lower carrier 2, an upper revolving unit 3, a work implement 4, a counterweight 5, an engine 7, and a cab 10, as shown in FIG. 1. A main body of the hydraulic excavator is mainly constituted of lower carrier 2 and upper revolving unit 3.

Lower carrier 2 has a pair of crawler belts P wound around left and right opposing end portions in a direction of travel. Lower carrier 2 is structured to be self-propelled as the pair of crawler belts P rotates.

Upper revolving unit 3 is set to be revolvable in any direction with respect to lower carrier 2. Upper revolving unit 3 includes, on a front left side, cab 10 which is an operator's cab that an operator of hydraulic excavator 1 gets on and off. Upper revolving unit 3 includes, on a rear side, counterweight 5 and an engine compartment for accommodating engine 7.

In the present embodiment, the forward side (front side) of a driver seated in cab 10 is defined as the forward side of upper revolving unit 3, the rear side of the driver seated therein is defined as the rear side of upper revolving unit 3, the left side of the driver in the seated state is defined as the left side of upper revolving unit 3, and the right side of the driver in the seated state is defined as the right side of upper revolving unit 3. In the description below, fore, aft, left, and right of upper revolving unit 3 correspond to fore, aft, left, and right of hydraulic excavator 1, respectively. In addition, located relatively closer to the center of upper revolving unit 3 is defined as inward, and located relatively more distant from the center of upper revolving unit 3 is defined as outward. In the drawings below, the fore/aft direction is shown with an arrow X in the drawings, the lateral direction is shown with an arrow Y in the drawings, and the vertical direction is shown with an arrow Z in the drawings.

Work implement 4 for such work as excavation of soil is pivotally supported by upper revolving unit 3 so as to be freely operable in the vertical direction. Work implement 4 has a boom 4a attached to be operable in the vertical direction in a substantially central portion on the forward side of upper revolving unit 3, an arm 4b attached to be operable in the fore/aft direction at the leading end of boom 4a, and a bucket 4c attached to be operable in the fore/aft direction at the leading end of arm 4b. Boom 4a, arm 4b, and bucket 4c are each configured to be driven by a hydraulic cylinder 58.

Work implement 4 is provided on the right side of cab 10, which is one lateral side of cab 10, such that an operator who is aboard cab 10 can view the leading end of work implement 4. Cab 10 is arranged laterally with respect to a portion where work implement 4 is attached.

Counterweight 5 is a weight arranged in the rear portion of upper revolving unit 3 for keeping balance of the excavator's body during excavation or the like. Hydraulic excavator 1 is formed as a short tail swing hydraulic excavator, which is small in radius of swing of a rear surface of counterweight 5. Therefore, the rear surface of counterweight 5 is formed in an arc shape around a center of swing of upper revolving unit 3 when viewed from above. Engine 7 is accommodated in the engine compartment in the rear portion of upper revolving unit 3.

Figure 2:
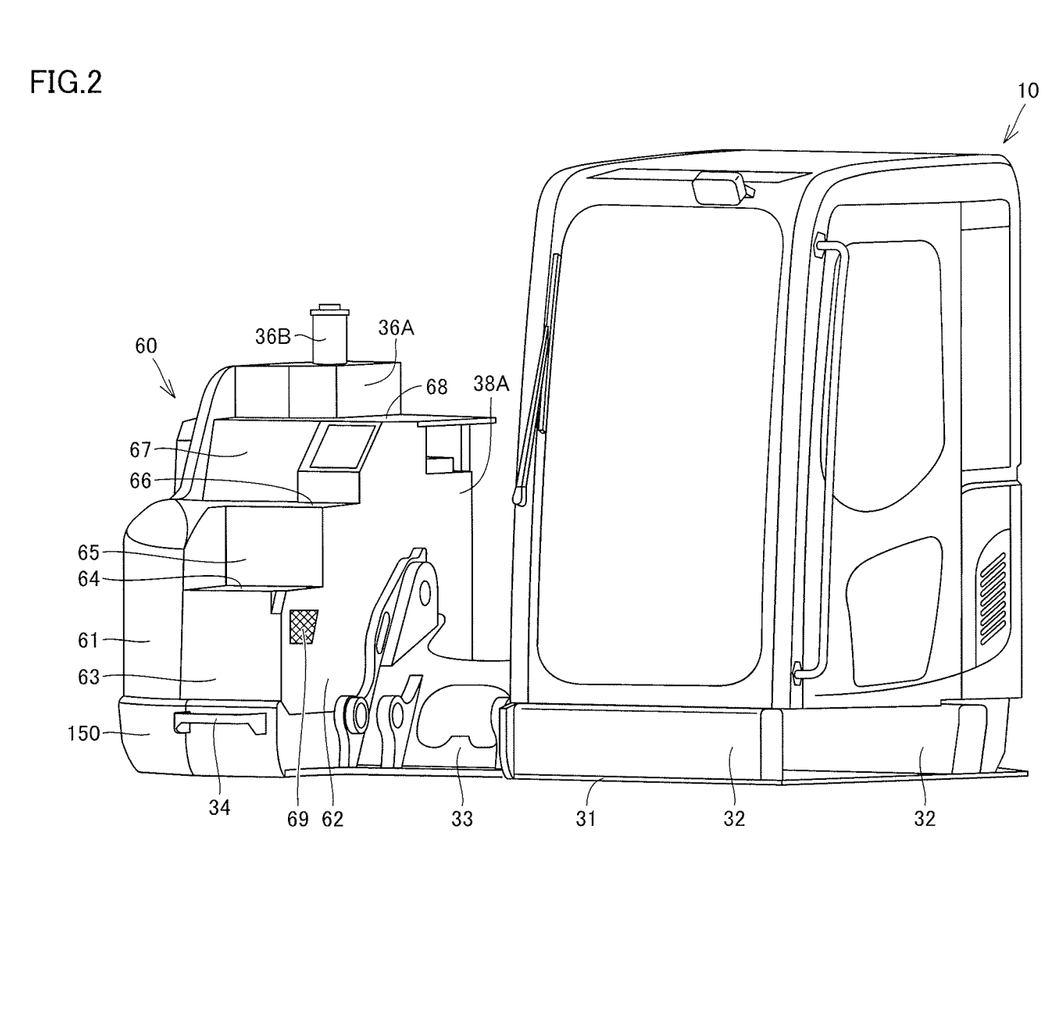
FIG. 2 is a perspective view showing a partial structure of an upper revolving unit of the hydraulic excavator in FIG. 1.

FIG. 2 is a perspective view showing a partial structure of upper revolving unit 3 of hydraulic excavator in FIG. 1. In FIG. 2, a part of the structure of upper revolving unit 3 of hydraulic excavator 1 shown in FIG. 1, as seen from the front left side, is illustrated. As shown in FIG. 2, upper revolving unit 3 has a revolving frame 31. Revolving frame 31 is included in the main body of the hydraulic excavator. Revolving frame 31 is arranged above lower carrier 2 shown in FIG. 1, and provided to freely revolve in any direction with respect to lower carrier 2.

On the upper surface of revolving frame 31, a pair of floor frames 32, 32 is arranged in the fore/aft direction with a space therebetween. Cab 10 is placed on floor frames 32, 32. Cab 10 is mounted on revolving frame 31 with floor frames 32 interposed therebetween.

At the front end of a central portion in the lateral direction of revolving frame 31, a center bracket 33 is provided. The proximal end of work implement 4 shown in FIG. 1 is attached to center bracket 33. Center bracket 33 supports work implement 4 of hydraulic excavator 1, and forms the portion where work implement 4 is attached.

Figure 3:
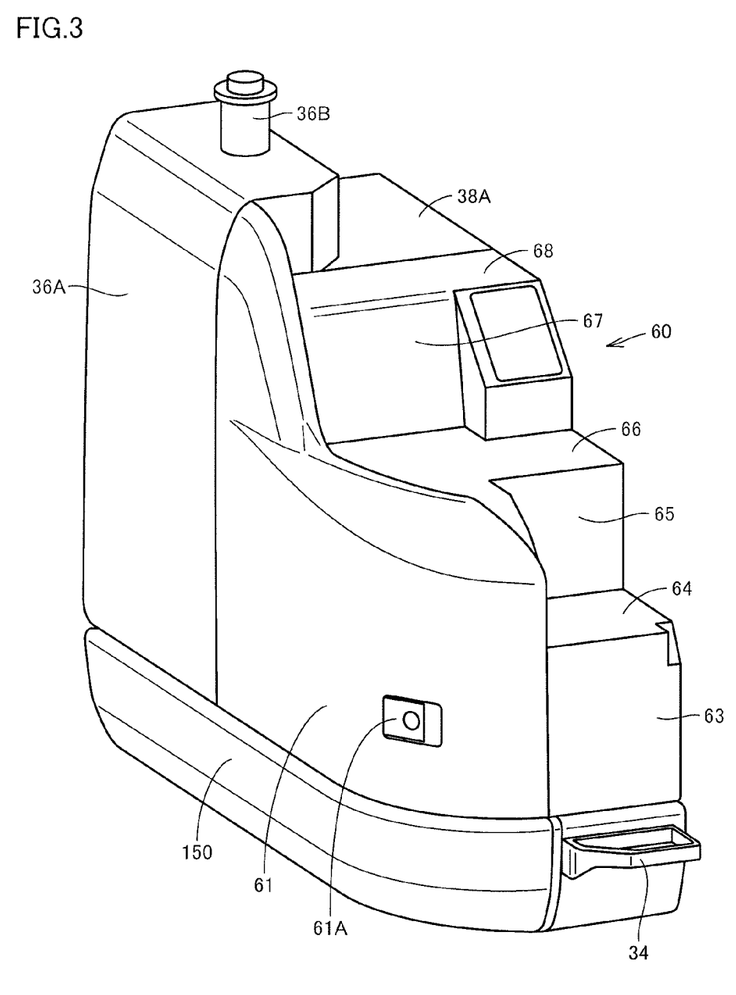
FIG. 3 is a perspective view showing a structure of a front cover and tank covers.

At a right forward side of revolving frame 31, a front cover 60 is arranged. Tank covers 36A, 38A are arranged rearward with respect to front cover 60. FIG. 3 is a perspective view showing a structure of front cover 60 and tank covers 36A, 38A. In front cover 60, a tank room 92 and a valve room 97 which will be described later herein are formed. In tank cover 36A, a fuel tank 36 which will be described later herein is housed. In the upper surface of tank cover 36A, a filler port 36B is provided for replenishing fuel tank 36 with a fuel. In tank cover 38A, a hydraulic oil tank 38 which will be described later herein is housed.

Front cover 60 has an open/close cover 61 and a left side plate 62. Open/close cover 61 forms the right side of front cover 60 and forms a part of a lateral side of the main body of the hydraulic excavator. Open/close cover 61 extends from the front end of tank cover 36A toward the front end of upper revolving unit 3. Open/close cover 61 is provided so that it is openable and closable. Open/close cover 61 has a handle 61A. A serviceperson can hold handle 61A of open/close cover 61 in a closed state to pivot open/close cover 61 and thereby open open/close cover 61.

Left side plate 62 shown in FIG. 2 forms the left side of front cover 60. Left side plate 62 is opposite to open/close cover 61 with some components such as a reducing agent tank 20 and a main valve 57, which will be described later herein, interposed therebetween. Left side plate 62 is opposite to the right side of cab 10 with center bracket 33 interposed therebetween. Left side plate 62 extends in the fore/aft direction of upper revolving unit 3. In left side plate 62, a vent hole 69 is formed. Vent hole 69 allows tank room 92, which is formed inside front cover 60, and an external space of front cover 60 to communicate with each other.

Front cover 60 also has a front end plate 63, a lower step plate 64, a vertical plate 65, an upper step plate 66, a vertical plate 67, and a ceiling plate 68. Front cover 60 is provided between tank covers 36A, 38A and the front end of upper revolving unit 3.

Front end plate 63 is provided to extend in the vertical direction at the front end of upper revolving unit 3. Lower step plate 64 extends rearward from the upper edge of front end plate 63. Vertical plate 65 extends upward from the rear edge of lower step plate 64. Upper step plate 66 extends rearward from the upper edge of vertical plate 65. Vertical plate 67 extends upward from the rear edge of upper step plate 66. Ceiling plate 68 extends rearward from the upper edge of vertical plate 67. Ceiling plate 68 is arranged so that it is substantially coplanar with the upper surface of tank cover 38A.

A step 34 is provided to protrude forward from front end plate 63. Front end plate 63, lower step plate 64, vertical plate 65, upper step plate 66, vertical plate 67, and ceiling plate 68 constitute a shape of stairs. Placement of feet on step 34 and then on lower step plate 64 and upper step plate 66 of front cover 60 in this order enables easy access onto ceiling plate 68. Accordingly, a serviceperson can easily and safely perform work such as replenishment of fuel tank 36 with a fuel, oil supply to hydraulic oil tank 38, and maintenance of engine 7.

Figure 4:
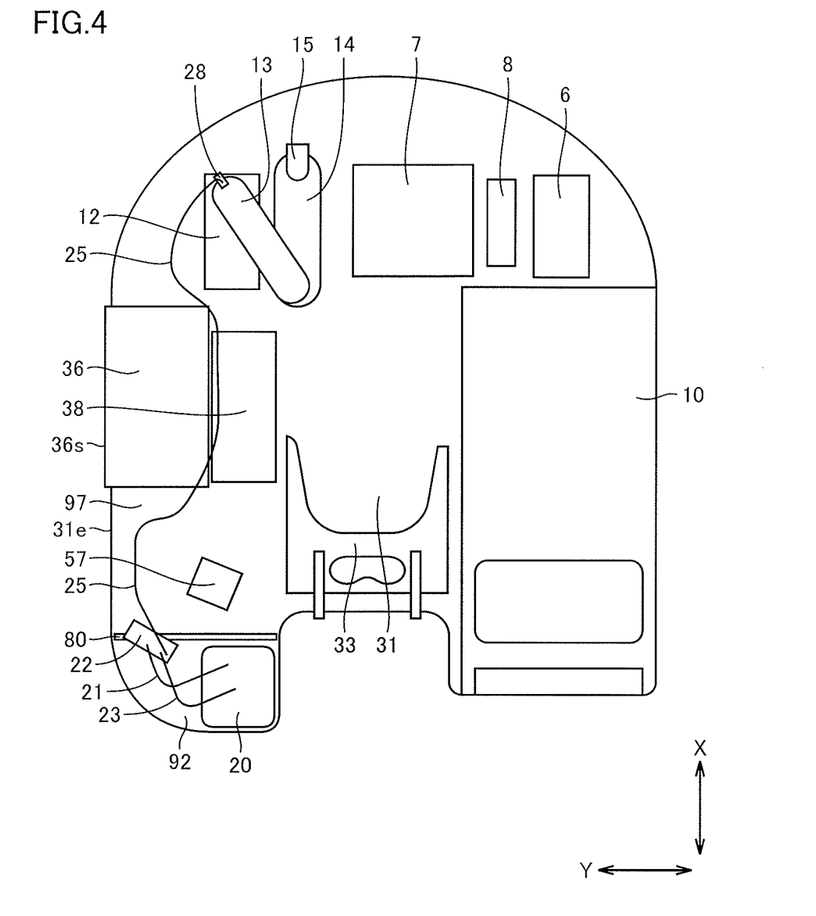
FIG. 4 is a schematic plan view showing arrangement of each device on a revolving frame.

Next, a description will be given, with reference to FIG. 4, of a path of reducing agent piping from the reducing agent tank to an exhaust gas treatment unit in hydraulic excavator 1 of the present embodiment. FIG. 4 is a schematic plan view showing arrangement of each device on revolving frame 31. The lower side in FIG. 4 is the forward side of upper revolving unit 3 and the upper side in FIG. 4 is the rear side of upper revolving unit 3. FIG. 4 illustrates a path of piping (a supply pipe 21 and a delivery pipe 25) for supplying a reducing agent from reducing agent tank 20 to the exhaust gas treatment unit over revolving frame 31 in hydraulic excavator 1 shown in FIG. 1.

Engine 7 which is a motive power source for driving lower carrier 2 and work implement 4 shown in FIG. 1 is mounted on revolving frame 31. Engine 7 is mounted on a rear portion of a center frame located at the center in the lateral direction of revolving frame 31. Engine 7 which is large in weight is arranged at the rear end of the main body of the hydraulic excavator, which is distant from center bracket 33 supporting work implement 4 and is close to counterweight 5, in consideration of weight balance with work implement 4 attached to the front of the main body of the hydraulic excavator. The engine compartment accommodating engine 7 is provided in the rear portion of upper revolving unit 3.

The engine compartment accommodates a cooling unit 6 and a fan 8. In the engine compartment, cooling unit 6, fan 8, and engine 7 are disposed in this order from left to right. Fan 8 is rotationally driven by engine 7 so as to generate a flow of air which passes through the engine compartment. Fan 8 generates a flow of air from the left to the right of the main body of the hydraulic excavator. Cooling unit 6 is arranged on the left of fan 8, which is upstream in the flow of air generated by fan 8. Engine 7 is arranged on the right of fan 8, which is downstream in the flow of air generated by fan 8.

Cooling unit 6 is structured to include a radiator 16 (FIG. 5) which will be described later herein, an intercooler, and an oil cooler. Radiator 16 is a cooling device for cooling a coolant for engine 7. The intercooler is a cooling device for cooling compression air supplied to engine 7. The oil cooler is a cooling device for cooling a hydraulic oil supplied to various hydraulic actuators mounted on hydraulic excavator 1, such as hydraulic cylinder 58 (FIG. 1).

Hydraulic excavator 1 also includes in the engine compartment, an exhaust gas treatment unit for treating and purifying an exhaust gas emitted from engine 7. The exhaust gas treatment unit mainly includes exhaust gas treatment devices 12 and 14, an intermediate connection pipe 13, an exhaust stack 15, and an injection nozzle 28 for a reducing agent. In the plan view shown in FIG. 4, the exhaust gas treatment unit is arranged on the right of engine 7. A hydraulic pump (not shown) driven by engine 7 to transfer a hydraulic oil is directly coupled to engine 7. The hydraulic pump is arranged adjacently on the right of engine 7 and the exhaust gas treatment unit is arranged above the hydraulic pump.

Exhaust gas treatment device 12 is connected to engine 7 through an exhaust pipe 11 (FIG. 5) which will be described later herein. Exhaust gas treatment device 14 is connected to exhaust gas treatment device 12 through intermediate connection pipe 13. The exhaust gas emitted from engine 7 is passed successively through exhaust gas treatment devices 12 and 14 and emitted from exhaust stack 15 into atmosphere. In the flow of emission of the exhaust gas from engine 7, exhaust gas treatment device 12 is arranged downstream of engine 7 and exhaust gas treatment device 14 is arranged downstream of exhaust gas treatment device 12.

Exhaust gas treatment device 12 oxidizes an unburned gas such as carbon monoxide and hydrocarbon contained in the exhaust gas emitted from engine 7 so as to lower a concentration of the unburned gas in the exhaust gas. Exhaust gas treatment device 12 is a diesel oxidation catalyst device, for example. Exhaust gas treatment device 14 reduces a nitrogen oxide contained in the exhaust gas through reaction with a reducing agent and chemically changes the nitrogen oxide to a harmless nitrogen gas, to thereby lower a concentration of the nitrogen oxide in the exhaust gas. Exhaust gas treatment device 14 is an $NO_x$ removal device of a selective catalytic reduction type, for example. Intermediate connection pipe 13 is provided with injection nozzle 28 for injecting a reducing agent into intermediate connection pipe 13. Intermediate connection pipe 13 has a function as a mixing pipe for injecting and mixing the reducing agent into the exhaust gas.

Hydraulic excavator 1 also includes a reducing agent supply portion for supplying a reducing agent to the exhaust gas treatment unit. The reducing agent supply portion includes reducing agent tank 20 and a reducing agent pump 22. Reducing agent tank 20 stores a reducing agent used in exhaust gas treatment device 14. For example, a urea solution is suitably employed as the reducing agent. The reducing agent, however, is not limited thereto.

Reducing agent tank 20 and reducing agent pump 22 are mounted on a right side frame of revolving frame 31. Reducing agent pump 22 is arranged forward relative to the engine compartment. Reducing agent tank 20 is arranged forward relative to reducing agent pump 22. Reducing agent tank 20 is arranged at a distance from engine 7 which is a device at a high temperature, for prevention of deterioration of the reducing agent due to a temperature increase thereof, and it is arranged, for example, at the front end of revolving frame 31.

Reducing agent tank 20 and reducing agent pump 22 are coupled to each other through supply pipe 21 and a return pipe 23. Supply pipe 21 is a pipe for sending the reducing agent from reducing agent tank 20 to reducing agent pump 22. Return pipe 23 is a pipe for returning the reducing agent from reducing agent pump 22 to reducing agent tank 20. Reducing agent pump 22 and injection nozzle 28 are coupled to each other through delivery pipe 25. Delivery pipe 25 is a pipe for transferring the reducing agent from reducing agent pump 22 to injection nozzle 28.

The reducing agent transferred from reducing agent tank 20 through supply pipe 21 to reducing agent pump 22 is branched into two in reducing agent pump 22. The reducing agent not used for exhaust gas treatment is returned from reducing agent pump 22 through return pipe 23 to reducing agent tank 20. The reducing agent used for exhaust gas treatment reaches injection nozzle 28 from reducing agent pump 22 through delivery pipe 25 and is sprayed from injection nozzle 28 into intermediate connection pipe 13.

The exhaust gas from engine 7 flows into exhaust gas treatment device 14 through intermediate connection pipe 13. Intermediate connection pipe 13 is provided upstream of exhaust gas treatment device 14 in the flow of the exhaust gas. The reducing agent suctioned from reducing agent tank 20 is injected into the exhaust gas which flows through intermediate connection pipe 13, through injection nozzle 28 attached to intermediate connection pipe 13. The reducing agent is injected into the upstream side of exhaust gas treatment device 14 in the flow of the exhaust gas. An amount of the reducing agent injected into the exhaust gas is controlled based on a temperature of the exhaust gas which passes through exhaust gas treatment device 14 and a concentration of a nitrogen oxide in the exhaust gas.

Reducing agent tank 20 is arranged at the front end on revolving frame 31 and exhaust gas treatment device 14 is arranged at the rear end on revolving frame 31. With this arrangement, supply pipe 21 and delivery pipe 25 for transferring the reducing agent extend in the fore/aft direction of the main body of the hydraulic excavator and extend from the front end toward the rear end of revolving frame 31.

On the right side frame of revolving frame 31, fuel tank 36, hydraulic oil tank 38, and main valve 57 are also mounted. Fuel tank 36 stores a fuel to be supplied to engine 7. Hydraulic oil tank 38 stores a hydraulic oil to be supplied to such a hydraulic actuator as hydraulic cylinder 58 (FIG. 1).

Revolving frame 31 has a lateral edge 31e which is a lateral edge portion. Fuel tank 36 has a lateral side surface 36s. A right lateral side surface 36s of fuel tank 36 is located outward relative to lateral edge 31e of revolving frame 31. The volume of fuel tank 36 is thus increased to thereby enable a greater quantity of fuel to be stored in fuel tank 36.

Since fuel tank 36 and hydraulic oil tank 38 are large in weight, they are arranged at positions located forward with respect to the exhaust gas treatment unit, in consideration of weight balance on revolving frame 31. Taking into account operability in an operation for replenishing fuel tank 36 with a fuel, fuel tank 36 is arranged closer to lateral edge 31e of revolving frame 31 than hydraulic oil tank 38. Fuel tank 36 and hydraulic oil tank 38 are each formed as a pressure-resistant tank in a rectangular parallelepiped shape. The front surface of each of fuel tank 36 and hydraulic oil tank 38 is formed as a rear wall of valve room 97 accommodating main valve 57.

Main valve 57 is formed as an assembly of a large number of control valves, pilot valves, and the like. Main valve 57 supplies and discharges a hydraulic oil suctioned from hydraulic oil tank 38 and transferred by the hydraulic pump to and from such a hydraulic actuator as hydraulic cylinder 58 shown in FIG. 1, as well as a motor for travel and a motor for swing which are not shown. Thus, main valve 57 actuates the body of hydraulic excavator 1 and work implement 4 in response to an operation by an operator.

Since main valve 57 is smaller in weight than fuel tank 36 and hydraulic oil tank 38, it is arranged forward with respect to fuel tank 36 and hydraulic oil tank 38, in consideration of weight balance on revolving frame 31. Main valve 57 is arranged rearward with respect to reducing agent tank 20.

Valve room 97 accommodating main valve 57 and tank room 92 accommodating reducing agent tank 20 are partitioned off from each other by a partition plate 80. Partition plate 80 is arranged rearward with respect to reducing agent tank 20 and forward with respect to main valve 57, and arranged between reducing agent tank 20 and main valve 57.

Partition plate 80 is interposed between reducing agent tank 20 and main valve 57 in the fore/aft direction of upper revolving unit 3.

Partition plate 80 is formed as a front wall of valve room 97. Partition plate 80 is formed as a rear wall of tank room 92. A front wall of tank room 92 is formed by front end plate 63 shown in FIGS. 2 and 3. A right sidewall of tank room 92 is formed by open/close cover 61 in the closed state shown in FIG. 3. A left sidewall of tank room 92 is formed by left side plate 62 shown in FIG. 2.

Open/close cover 61, left side plate 62, front end plate 63, and partition plate 80 constitute a wall portion defining tank room 92. Of the wall portion defining tank room 92, only partition plate 80 which is the rear wall portion is interposed between main valve 57 and reducing agent tank 20. Of the wall portion defining tank room 92, left side plate 62 which is a left wall portion has vent hole 69 (FIG. 2) formed therein. Vent hole 69 is formed to serve as a communication hole allowing the inside and the outside of tank room 92 to communicate with each other.

Reducing agent tank 20 is arranged at a corner of tank room 92 as seen in a plan view, in a front portion in tank room 92. Reducing agent tank 20 is formed substantially in a rectangular parallelepiped shape. The front surface of reducing agent tank 20 is opposite to front end plate 63 with a slight gap between the front surface and front end plate 63. The left surface of reducing agent tank 20 is opposite to left side plate 62 with a slight gap between the left surface and left side plate 62. Reducing agent tank 20 is arranged relatively closer to the front wall of tank room 92 than to the rear wall thereof.

At the corner formed by front end plate 63 and left side plate 62, reducing agent tank 20 is arranged. As shown in FIGS. 2 and 3, a front end portion of open/close cover 61 is curved. Therefore, reducing agent tank 20 which is rectangular as seen in a plan view is arranged adjacently to left side plate 62 to thereby enable reducing agent tank 20 to be located closer to the wall portion which defines tank room 92.

Figure 5:
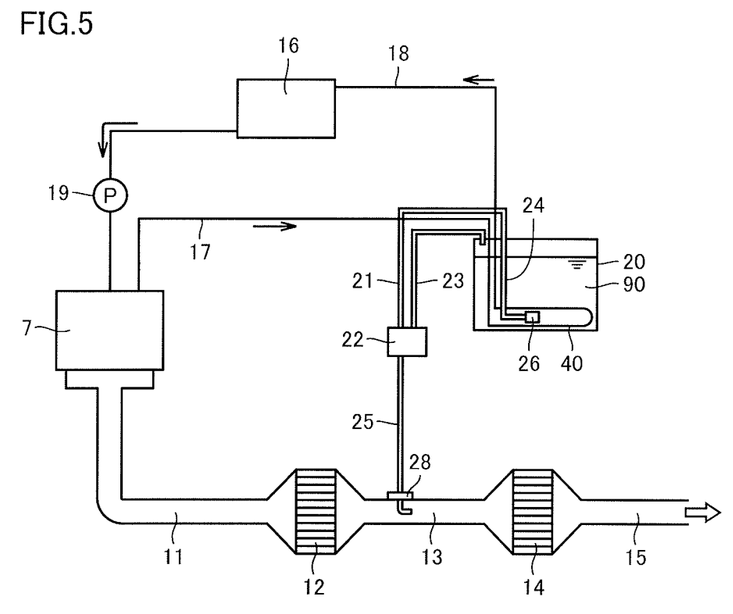
FIG. 5 is a functional diagram schematically showing a path for a reducing agent, a path for a medium for use in heat exchange, and an exhaust path for an exhaust gas from an engine.

FIG. 5 is a functional diagram schematically showing a path for the reducing agent, a path for a medium for use in heat exchange, and an exhaust path for the exhaust gas from engine 7 in hydraulic excavator 1 of the present embodiment. As shown in FIG. 5, the exhaust gas emitted from engine 7 is passed successively through exhaust pipe 11, exhaust gas treatment device 12, intermediate connection pipe 13, and exhaust gas treatment device 14 and then exhausted from exhaust stack 15 to the outside of the hydraulic excavator. Injection nozzle 28 is provided in intermediate connection pipe 13 located upstream of exhaust gas treatment device 14 in the flow of the exhaust gas.

A reducing agent 90 is stored in reducing agent tank 20. A suction pipe 24 in which reducing agent 90 which flows out of reducing agent tank 20 flows is arranged in reducing agent tank 20. A strainer (filter) 26 is connected to the leading end of suction pipe 24. Suction pipe 24 is coupled to supply pipe 21. Reducing agent 90 suctioned from reducing agent tank 20 is transferred by reducing agent pump 22 and reaches injection nozzle 28 after successively passed through supply pipe 21 and delivery pipe 25. Reducing agent 90 not used for exhaust gas treatment is returned to reducing agent tank 20 from reducing agent pump 22 through return pipe 23.

Injection nozzle 28 has a function as a reducing agent injector for injecting reducing agent 90 suctioned from reducing agent tank 20 to the upstream side of the exhaust gas relative to exhaust gas treatment device 14. Injection nozzle 28 supplies reducing agent 90 into the exhaust gas which flows through intermediate connection pipe 13. The concentration of a nitrogen oxide in the exhaust gas lowers as a result of reaction of the nitrogen oxide contained in the exhaust gas with reducing agent 90 in exhaust gas treatment device 14. In a case that a urea solution is employed as reducing agent 90, the urea solution is decomposed in intermediate connection pipe 13 and converted to ammonia, so that the nitrogen oxide is decomposed to harmless nitrogen and oxygen as a result of reaction between the nitrogen oxide and ammonia. An exhaust gas in which the amount of nitrogen oxide has lowered to an appropriate value is emitted through exhaust stack 15.

In reducing agent tank 20, a heat exchanger 40 is arranged through which a medium for heat exchange with reducing agent 90 (heat exchange medium) flows. As the heat exchange medium, a coolant for engine 7 is used. Heat exchanger 40 has a first conduit directing the heat exchange medium into reducing agent tank 20, and a second conduit for flowing the heat exchange medium out of reducing agent tank 20. The first conduit is coupled to a coolant pipe 17. The second conduit is coupled to a coolant pipe 18. On coolant pipe 18, radiator 16 and a coolant pump 19 are provided.

Coolant pump 19 is driven to cause the coolant for engine 7 to circulate through engine 7, heat exchanger 40, radiator 16, and coolant pump 19. The coolant heated by engine 7 exchanges its heat with reducing agent 90 in heat exchanger 40 to be accordingly cooled. Meanwhile, reducing agent 90 receives heat from the coolant to be accordingly heated. Radiator 16 is a heat exchanger for exchanging heat between the coolant and air to cool the coolant. The coolant cooled in radiator 16 flows in a water jacket of engine 7 to appropriately cool engine 7.

Reducing agent tank 20 is arranged at the frontward end on revolving frame 31. Engine 7 and cooling unit 6 which includes radiator 16 are arranged rearward on revolving frame 31. Because of this arrangement, coolant pipe 17 connecting reducing agent tank 20 and engine 7 to each other and coolant pipe 18 connecting reducing agent tank 20 and radiator 16 to each other extend in the fore/aft direction of the hydraulic excavator's main body and extend between tank room 92 at the forward end of revolving frame 31 and the rearward engine compartment.

Figure 6:
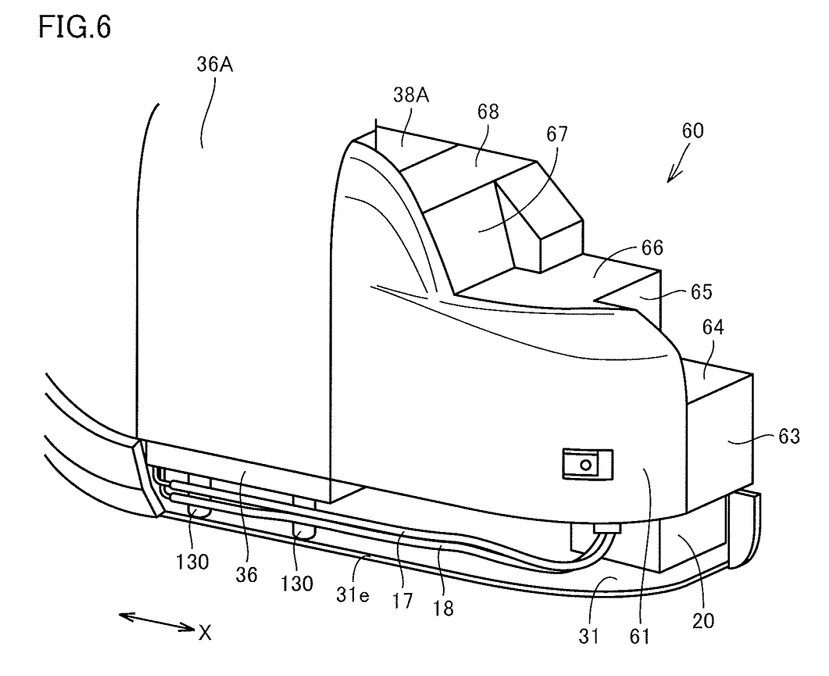
FIG. 6 is a front-left perspective view of the hydraulic excavator in FIG. 1 in a state where an exterior cover and reinforcement plates have been removed.

FIG. 6 is a front-left perspective view of hydraulic excavator 1 in FIG. 1 in a state where an exterior cover 150 (FIGS. 2, 3) and reinforcement plates which will be described later herein have been removed. As shown in FIG. 6, a mount member 130 is provided on revolving frame 31. Fuel tank 36 is mounted on mount member 130. Mount member 130 is interposed between fuel tank 36 and revolving frame 31 and supports fuel tank 36. Mount member 130 has a plurality of columnar members separated from each other in the fore/aft direction of the hydraulic excavator's main body. The intervals between these plurality of members are made as large as possible to thereby enable fuel tank 36 to be more stably mounted on mount member 130.

Fuel tank 36 is mounted on revolving frame 31 with mount member 130 interposed therebetween, and a space is formed between the bottom surface of fuel tank 36 and revolving frame 31. In this space, hydraulic piping is arranged to connect main valve 57 and the hydraulic pump which is directly coupled to the engine.

As shown in FIG. 4, fuel tank 36 is arranged forward of exhaust gas treatment device 14 and rearward of reducing agent tank 20. Therefore, mount member 130 on which fuel tank 36 is mounted is also arranged forward of exhaust gas treatment device 14 and rearward of reducing agent tank 20.

Exterior cover 150 laterally covers mount member 130. In the state where exterior cover 150 is attached, mount member 130 is invisible from the outside. As shown in FIG. 6, detachment of exterior cover 150 makes mount member 130 visible from the lateral side of hydraulic excavator 1.

Fuel tank 36 partially protrudes laterally from lateral edge 31e of revolving frame 31 as shown in FIG. 4. Mount member 130 is attached to revolving frame 31. The bottom surface of fuel tank 36 extends outward relative to mount member 130. A space which faces the bottom surface of fuel tank 36 is present outward of mount member 130.

Coolant pipe 17 in which the coolant flows from engine 7 toward reducing agent tank 20 and coolant pipe 18 in which the coolant flows from reducing agent tank 20 toward radiator 16 extend along each other. Coolant pipes 17, 18 extend in the fore/aft direction of the hydraulic excavator's main body. Coolant pipes 17, 18 extend downward from reducing agent tank 20 and extend along the upper surface of revolving frame 31. Coolant pipes 17, 18 extend along lateral edge 31e of revolving frame 31. With respect to mount member 130, coolant pipes 17, 18 extend outward of the hydraulic excavator's main body.

Figure 7:
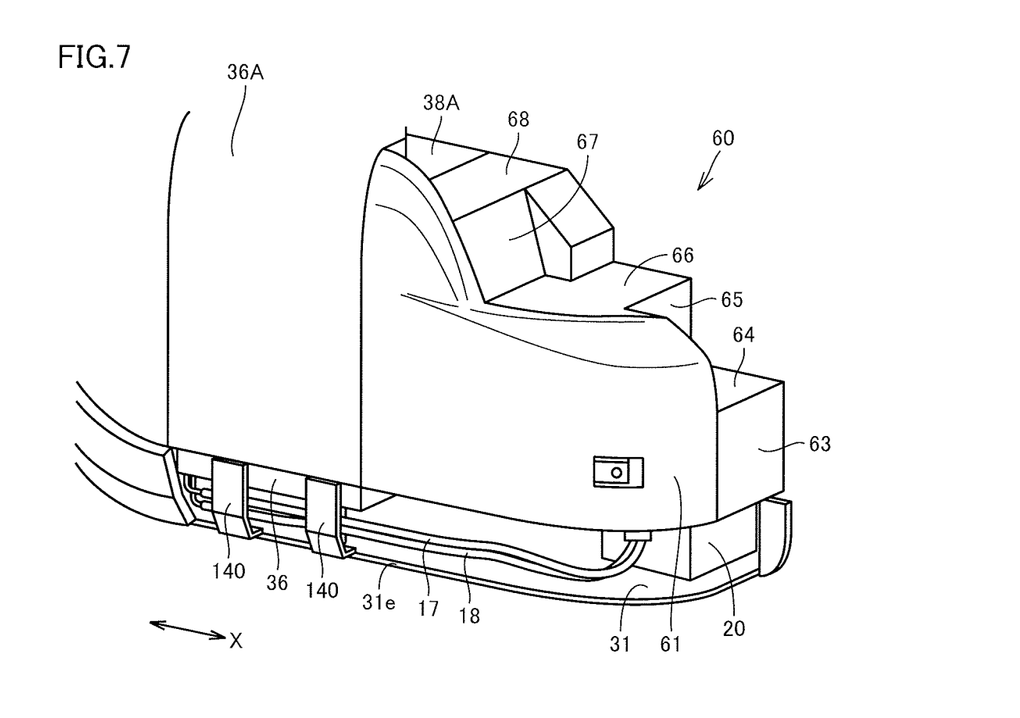
FIG. 7 is a front-left perspective view of the hydraulic excavator in FIG. 1 in a state where the exterior cover has been removed and the reinforcement plates are attached.

FIG. 7 is a front-left perspective view of hydraulic excavator 1 in FIG. 1 in a state where exterior cover 150 has been removed and reinforcement plates 140 are attached. In FIG. 7, the state is illustrated where reinforcement plates 140 are additionally attached to hydraulic excavator 1 as seen from the front left at the same angle as FIG. 6. To hydraulic excavator 1 shown in FIG. 7, two reinforcement plates 140, 140 are attached. Reinforcement plates 140 are provided outward with respect to coolant pipes 17, 18. Coolant pipes 17, 18 are thus partially covered with reinforcement plates 140 and made invisible laterally.

Reinforcement plates 140 are arranged in the fore/aft direction of the hydraulic excavator's main body so that they overlap mount members 130. As shown in FIG. 6, in the vicinity of lateral edge 31e of revolving frame 31, two mount members 130 are arranged aligned in the fore/aft direction. Reinforcement plates 140 shown in FIG. 7 are arranged at respective positions overlapping mount member 130 as the hydraulic excavator's main body is seen laterally. Mount members 130 are covered with reinforcement plates 140 and thus made invisible.

Figure 8:
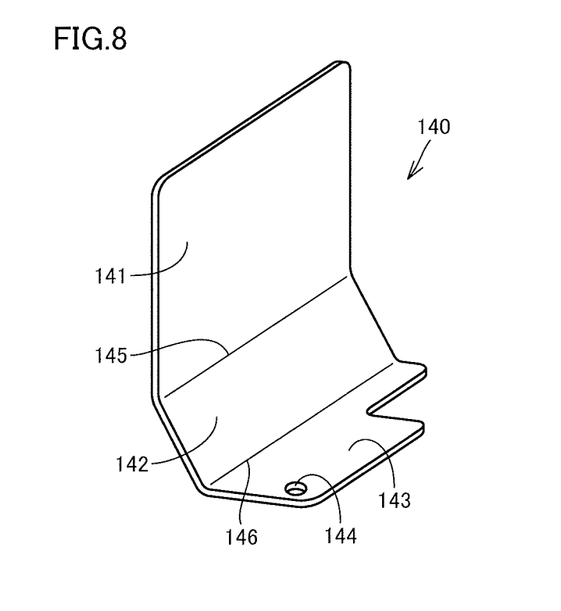
FIG. 8 is a perspective view of a reinforcement plate.

FIG. 8 is a perspective view of a reinforcement plate. As shown in FIG. 8, reinforcement plate 140 is formed of a thin sheet-like member having two bent portions. Reinforcement plate 140 has flat-sheet-like flat portions 141, 142, 143, a bent portion 145 between flat portion 141 and flat portion 142, and a bent portion 146 between flat portion 142 and flat portion 143. Reinforcement plate 140 is shaped to have two bent portions, and accordingly the strength of reinforcement plate 140 is improved.

Flat portion 141 and flat portion 142 form bent portion 145 therebetween, and are connected together to form an obtuse angle at bent portion 145. Flat portion 142 and flat portion 143 form bent portion 146 therebetween, and are connected together to form an obtuse angle at bent portion 146. Flat portion 141 and flat portion 143 are orthogonal to each other.

In flat portion 143, a through hole 144 extending through flat portion 143 in the thickness direction is formed. A bolt is inserted in this through hole 144 to thereby secure reinforcement plate 140 to revolving frame 31.

Figure 9:
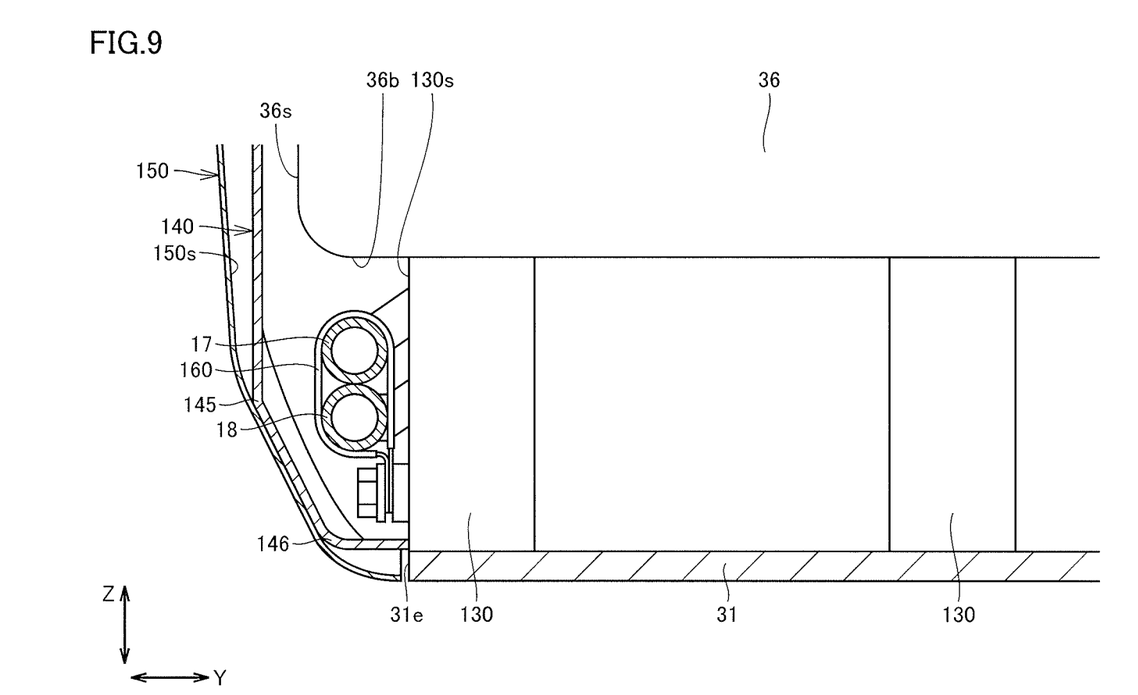
FIG. 9 is a cross-sectional view of the exterior cover and its nearby portion as seen from the front.

FIG. 9 is a cross-sectional view of the exterior cover and its nearby portion as seen from the front. As described above, revolving frame 31 has lateral edge 31e. On revolving frame 31, mount member 130 is provided, and fuel tank 36 is mounted on mount member 130.

Fuel tank 36 has a bottom surface 36b opposite to revolving frame 31 with a space interposed therebetween, and lateral side surface 36s located outward relative to lateral edge 31e of revolving frame 31. Mount member 130 is laterally covered with exterior cover 150. Mount member 130 has an outer surface 130s facing outward of the hydraulic excavator's main body. Exterior cover 150 has an inner surface 150s facing inward of the hydraulic excavator's main body.

Coolant pipes 17, 18 directing the coolant for engine 7 to reducing agent tank 20 are arranged, in the lateral direction of the hydraulic excavator's main body, between lateral edge 31e of revolving frame 31 and lateral side surface 36s of fuel tank 36. Coolant pipes 17, 18 are arranged below fuel tank 36, arranged outward of the hydraulic excavator's main body with respect to mount member 130, and arranged inward of the hydraulic excavator's main body with respect to exterior cover 150. Coolant pipes 17, 18 are arranged in the hollow space formed between mount member 130 and exterior cover 150. Coolant pipes 17, 18 are arranged to extend through the space under fuel tank 36 and between mount member 130 and exterior cover 150.

Coolant pipes 17, 18 are arranged at a position located opposite to bottom surface 36b of fuel tank 36, opposite to outer surface 130s of mount member 130, and opposite to inner surface 150s of exterior cover 150. Coolant pipes 17, 18 are arranged at the position located outward of the hydraulic excavator's main body, relative to lateral edge 31e of revolving frame 31, and inward of the hydraulic excavator's main body, relative to lateral side surface 36s of fuel tank 36. Fuel tank 36 is present above coolant pipes 17, 18, while revolving frame 31 is not present below coolant pipes 17, 18.

Coolant pipes 17, 18 are arranged aligned in the vertical direction. Coolant pipe 17 is arranged on the upper side and coolant pipe 18 is arranged on the lower side, and two coolant pipes 17, 18 are bundled together and supported by a clamp member 160. Clamp member 160 supports coolant pipes 17, 18 and also positions coolant pipes 17, 18.

To revolving frame 31, reinforcement plate 140 is secured. Reinforcement plate 140 is provided outward of the hydraulic excavator's main body, with respect to coolant pipes 17, 18, and inward of the hydraulic excavator's main body, with respect to exterior cover 150. At the position where reinforcement plate 140 is provided, coolant pipes 17, 18 are arranged between mount member 130 and reinforcement plate 140.

Reinforcement plate 140 has bent portion 145. Bent portion 145 is located at a position adjacent to coolant pipes 17, 18 in the vertical direction. Coolant pipes 17, 18 shown in FIG. 9 overlap mount member 130 as the hydraulic excavator's main body is seen laterally. Bent portion 145 is located between the upper end of coolant pipe 17 and the lower end of coolant pipe 18 shown in FIG. 9.

Figure 10:
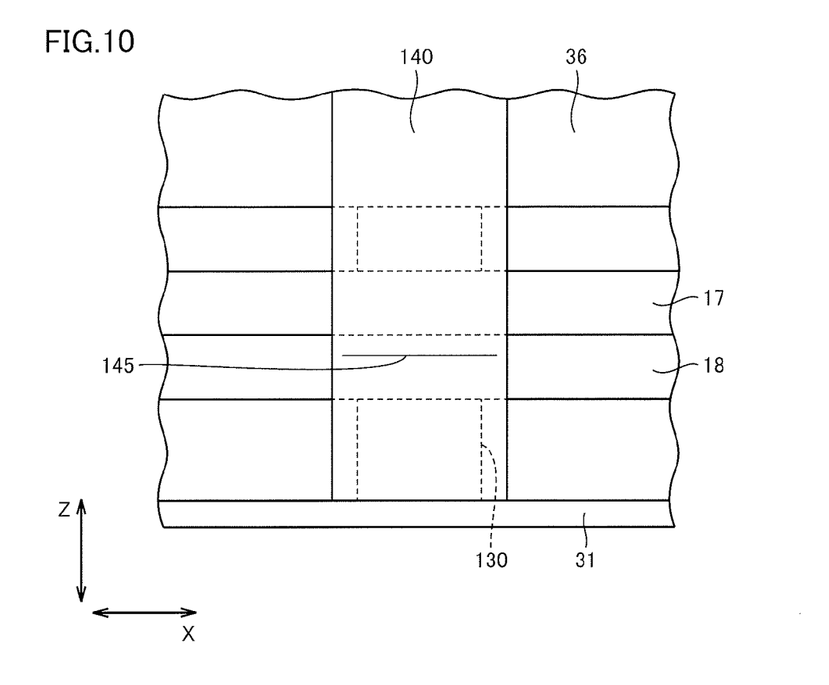
FIG. 10 is a schematic diagram showing an arrangement of a reinforcement plate with respect to a mount member.

FIG. 10 is a schematic diagram showing an arrangement of reinforcement plate 140 with respect to mount member 130. In FIG. 10, there is illustrated reinforcement plate 140 as seen laterally of the hydraulic excavator's main body, in the state where exterior cover 150 has been removed like the perspective view of FIG. 7.

In FIG. 10, mount member 130 is located inward of reinforcement plate 140 and directly invisible, and is thus indicated by broken lines. In the fore/aft direction of the hydraulic excavator's main body, the dimension of reinforcement plate 140 is only slightly larger than the dimension of mount member 130. In the fore/aft direction, the dimension of the portions of reinforcement plate 140 that extend beyond mount member 130 is smaller than the dimension of mount member 130 as shown in FIG. 10. Reinforcement plate 140 is thus dimensioned so that reinforcement plate 140 is provided in the fore/aft direction only at the position overlapping mount member 130.

Figure 11:
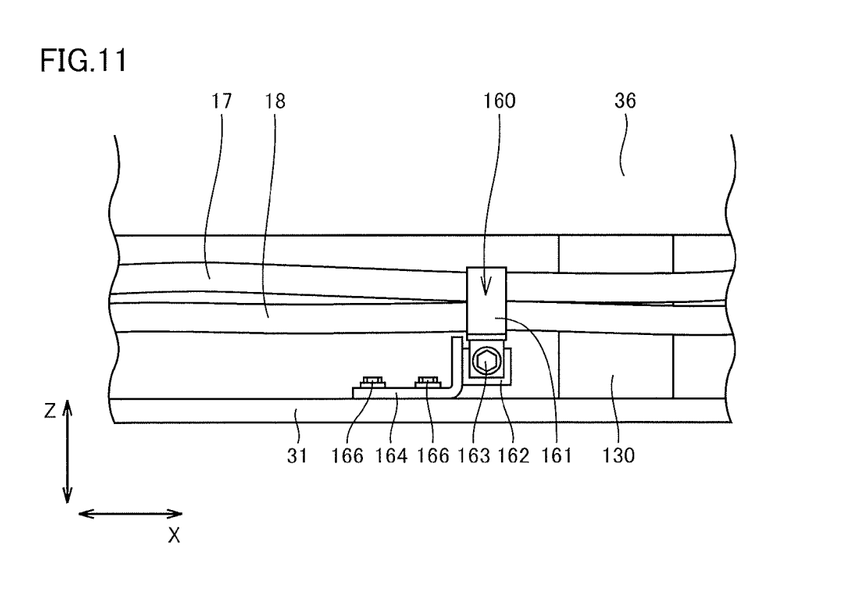
FIG. 11 is a side view showing a structure of a clamp member.

FIG. 11 is a side view showing a structure of clamp member 160. In FIG. 11, there is illustrated an enlarged view of mount member 130 and its nearby portion in the state where exterior cover 150 and reinforcement plates 140 have been removed, like the perspective view in FIG. 6.

As shown in FIG. 11, clamp member 160 has a clamp body 161, a coupled portion 162, and a secured portion 164. Clamp body 161 bundles coolant pipes 17, 18 together. Secured portion 164 is secured to revolving frame 31 with a bolt 166. Coupled portion 162 is coupled together with secured portion 164, and secures clamp body 161 with a bolt 163.

Clamp member 160 supports coolant pipes 17, 18 with respect to revolving frame 31. Clamp member 160 as shown in FIG. 11 is arranged near mount member 130 in the fore/aft direction of the hydraulic excavator's main body.

Next, functions and effects of the present embodiment will be described.

Hydraulic excavator 1 of the present embodiment includes, as shown in FIG. 9, mount member 130 provided on revolving frame 31 and fuel tank 36 mounted on mount member 130. Fuel tank 36 has lateral side surface 36s located outward relative to lateral edge 31e of revolving frame 31. Hydraulic excavator 1 further includes exterior cover 150 laterally covering mount member 130, coolant pipes 17, 18 directing a coolant for engine 7 to reducing agent tank 20, and reinforcement plate 140. Coolant pipes 17, 18 are arranged through a space under fuel tank 36 and between mount member 130 and exterior cover 150. Reinforcement plate 140 is provided outward of coolant pipes 17, 18 and inward of exterior cover 150.

Coolant pipes 17, 18 can be arranged immediately inward of exterior cover 150 to thereby facilitate access to coolant pipes 17, 18 and facilitate maintenance of coolant pipes 17, 18. In the case where coolant pipes 17, 18 are arranged outward of lateral edge 31e of revolving frame 31, it may occur that an impact is applied to exterior cover 150 due to an object hitting against exterior cover 150 while hydraulic excavator 1 is revolving, for example, a load is accordingly exerted on coolant pipes 17, 18 through deformed exterior cover 150, and coolant pipes 17, 18 are thus caught between exterior cover 150 and mount member 130.

Reinforcement plate 140 is provided between coolant pipes 17, 18 and exterior cover 150 so that exterior cover 150 and reinforcement plate 140 are provided outward of coolant pipes 17, 18 and the structure located outward of coolant pipes 17, 18 has an improved rigidity. Therefore, even when an impact is applied to exterior cover 150, deformation of the structure located outward of coolant pipes 17, 18 can be suppressed to keep the space in which coolant pipes 17, 18 can be housed. Thus, the load exerted on coolant pipes 17, 18 through exterior cover 150 can be reduced.

In this way, coolant pipes 17, 18 can be prevented from being caught between them, and coolant pipes 17, 18 can therefore be arranged in the space under fuel tank 36 and between mount member 130 and exterior cover 150. Coolant pipes 17, 18 can accordingly be arranged efficiently.

As shown in FIGS. 7 and 10, reinforcement plate 140 is provided at a position overlapping mount member 130 as seen laterally.

Since fuel tank 36 is mounted on mount member 130, a space is formed between bottom surface 36b of fuel tank 36 and revolving frame 31. At a position where mount member 130 is absent as seen laterally, even when a load is externally exerted on exterior cover 150, coolant pipes 17, 18 can be shifted into the space between fuel tank 36 and revolving space 31. Therefore, no excessive load will be exerted on coolant pipes 17, 18.

In order to prevent coolant pipes 17, 18 from being caught between exterior cover 150 and mount member 130, the rigidity of the structure located outward of coolant pipes 17, 18 may be enhanced at the position where mount member 130 is provided. Arrangement of reinforcement plate 140 at a position where mount member 130 is not provided will less effective in reducing the load exerted on coolant pipes 17, 18. In view of this, reinforcement plate 140 is provided at a position overlapping mount member 130 as seen laterally while reinforcement plate 140 is not provided at a position which does not overlap mount member 130 as seen laterally. In this way, reinforcement plate 140 can be made small while the strength necessary for protection of coolant pipes 17, 18 is ensured.

As shown in FIGS. 8 and 9, reinforcement plate 140 has bent portion 145. Bent portion 145 is formed between an upper end and a lower end of coolant pipes 17, 18 overlapping reinforcement plate 140 as seen laterally.

Reinforcement plate 140 can be formed to have bent portion 145, rather than formed into a flat sheet, to thereby improve the rigidity of reinforcement plate 140. In particular, reinforcement plate 140 has an enhanced rigidity at the position where bent portion 145 is provided. Bent portion 145 is arranged to overlap the position where coolant pipes 17, 18 are provided in the vertical direction, and accordingly coolant pipes 17, 18 can more reliably be protected by bent portion 145 having a high strength.

As shown in FIGS. 9 and 11, hydraulic excavator 1 further includes clamp member 160. Clamp member 160 supports coolant pipes 17, 18 with respect to revolving frame 31.

Clamp member 160 has a function of supporting coolant pipes 17, 18 and also has a function of positioning coolant pipes 17, 18. Clamp member 160 is arranged near mount member 130 to position coolant pipes 17, 18. Thus, coolant pipes 17, 18 and mount member 130 can be prevented from interfering with each other.

It should be construed that the embodiment disclosed herein is given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 hydraulic excavator; 4 work implement; 7 engine; 12, 14 exhaust gas treatment device; 13 intermediate connection pipe; 16 radiator; 17, 18 coolant pipe; 19 coolant pump; 20 reducing agent tank; 21 supply pipe; 22 reducing agent pump; 23 return pipe; 25 delivery pipe; 28 injection nozzle; 31 revolving frame; 31e lateral edge; 36 fuel tank; 36b bottom surface; 36s lateral side surface; 38 hydraulic oil tank; 40 heat exchanger; 57 main valve; 58 hydraulic cylinder; 60 front cover; 61 exterior cover; 62 left side plate; 63 front end plate; 64 lower step plate; 65, 67 vertical plate; 66 upper step plate; 68 ceiling plate; 69 vent hole; 80 partition plate; 90 reducing agent; 92 tank room; 97 valve room; 130 mount member; 130s outer surface; 140 reinforcement plate; 141, 142, 143 flat portion; 144 through hole; 145, 146 bent portion; 150 exterior cover; 150s inner surface; 160 clamp member; 161 clamp body; 162 coupled portion; 163, 166 bolt; 164 secured portion

The invention claimed is:

1. A hydraulic excavator comprising:
an engine;
an exhaust gas treatment device treating an exhaust gas from said engine through a reduction reaction;
a reducing agent tank arranged forward of said exhaust gas treatment device and storing a reducing agent to be supplied to said exhaust gas treatment device;
a revolving frame on which said engine, said exhaust gas treatment device, and said reducing agent tank are mounted;
a mount member provided on said revolving frame and located forward of said exhaust gas treatment device and rearward of said reducing agent tank;
a fuel tank mounted on said mount member and having a lateral side surface located outward relative to a lateral edge of said revolving frame;
an exterior cover laterally covering said mount member;
a coolant pipe arranged through a space under said fuel tank and between said mount member and said exterior cover, for directing a coolant for said engine to said reducing agent tank; and
a reinforcement plate provided outward of said coolant pipe and inward of said exterior cover.

2. The hydraulic excavator according to claim 1, wherein said reinforcement plate is provided at a position overlapping said mount member as seen laterally.

3. The hydraulic excavator according to claim 1, wherein said reinforcement plate has a bent portion formed between an upper end and a lower end of said coolant pipe overlapping said reinforcement plate as seen laterally.

4. The hydraulic excavator according to claim 1, further comprising a clamp member supporting said coolant pipe with respect to said revolving frame.

5. The hydraulic excavator according to claim 2, wherein said reinforcement plate has a bent portion formed between an upper end and a lower end of said coolant pipe overlapping said reinforcement plate as seen laterally.

6. The hydraulic excavator according to claim 2, further comprising a clamp member supporting said coolant pipe with respect to said revolving frame.

7. The hydraulic excavator according to claim 3, further comprising a clamp member supporting said coolant pipe with respect to said revolving frame.

8. The hydraulic excavator according to claim 5, further comprising a clamp member supporting said coolant pipe with respect to said revolving frame.

* * * * *